March 8, 1932. A. E. ATKINSON 1,848,762
DRILLING OF BORE HOLES
Filed Nov 11, 1930

A. E. Atkinson INVENTOR
By: Marbs & Clar ATTYS.

Patented Mar. 8, 1932 1,848,762

UNITED STATES PATENT OFFICE

ALBERT EDWARD ATKINSON, OF UPPER BURMA, BRITISH INDIA

DRILLING OF BORE HOLES

Application filed November 11, 1930, Serial No. 494,946, and in Great Britain June 19, 1930.

In the drilling of bore holes for tapping oil deposits there is a tendency for the pipe (down which water is pumped) carrying the drilling tool or bit at its lower end to bend or distort and so to allow of the production of a crooked bore hole.

The object of the present invention is to provide simple and efficient means for ensuring that the drill pipe for a distance above the bit is maintained concentric with the bore produced by the drilling bit so that straight boring is obtained.

In accordance with this invention, there are provided at intervals in the length of the drill pipe, combined reamers and guides which have cutting edges to maintain the bore of the hole and peripheral guiding surfaces to steady and centralize the drill pipe, the said parts also providing passages for the upward or return flow of the fluid pumped down the drill pipe to the cutting face together with the débris carried by said fluid.

Referring to the accompanying sheet of explanatory drawings:—

The same reference letters in the three views indicate the same parts.

In the illustrated application of the invention, each combined reamer and guide consists of a pipe $a$ with a tapered screwed plug, called a pin $b$, at one end and a tapered screwed socket, called a box $c$, at the other end. The guide is provided by the cylindrical peripheral surface of a collar $d$ secured upon or formed in one with the pipe, the connection being by way of spoke like parts $e$ extending between the pipe and collar so as to provide gaps or holes $f$ for the upward flow of the water and débris from the drilling bit. The collar $d$ has cutting edges $g$ provided upon its upper and lower sides, such edges being faced with suitable cutting or tool steel by welding or otherwise.

Figure 1:
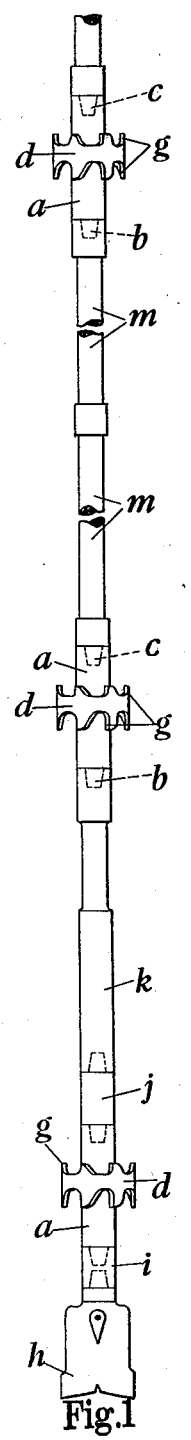
Figure 1 is a view showing a length of drill pipe with my improved combined reamers and guides fitted therein.
Figure 2:
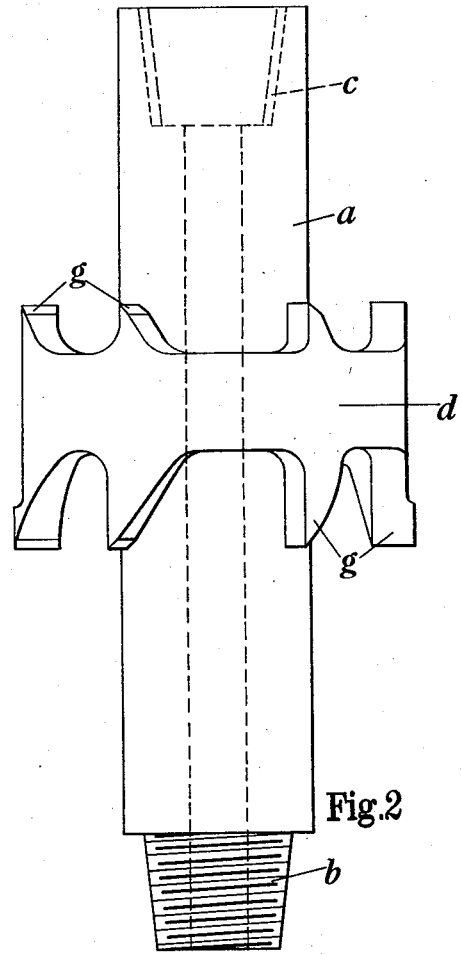
Figure 2 is an elevation and Figure 3 a plan view drawn to an enlarged scale showing one of the combined reamers and guides.
Figure 3:
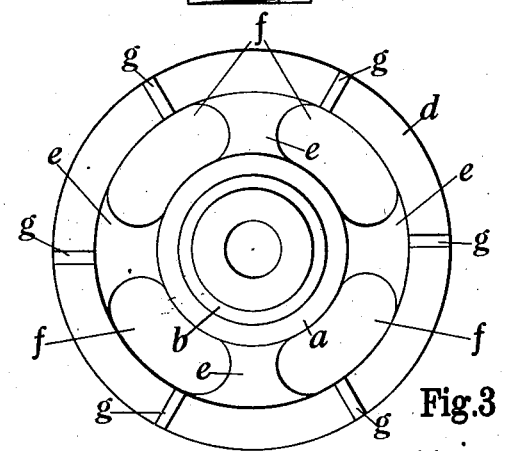

The combined reamers and guides are inserted in the drill pipe, as shown in Figure 1, so as to form parts thereof and they may be spaced at suitable intervals increasing in distance as they become more remote from the drilling bit $h$. I may employ, for example, four combined reamers and guides spaced so as to act over a length of, say, 100 feet from the drilling bit.

In one arrangement, the drilling bit $h$ with screwed plug or pin is secured in an adapter fitting $i$ having screwed sockets or boxes at both ends. The other end of such adapter fitting receives the plug or pin end of a combined reamer and guide. Above the latter is provided an adapter fitting $j$ having screwed plugs or pins at both ends, and between such fitting and the next combined reamer and guide is provided a length of drill pipe $k$. Similar but longer lengths of drill pipe $m$ are provided between the second and the next two combined reamers and guides. By spacing the two combined reamers and guides nearest to the drilling bit closer than the remaining two, I give greater stability to the drilling pipe adjacent to the bit.

With my improvement, the drill pipe is guided centrally with the bore hole produced by the drilling bit and such bore hole is reamed or trued as the drill descends.

What I claim is:—

A combined guide and reamer for drilling oil well bore holes, comprising in combination a tubular part for connection in the drill pipe at its opposite ends, a collar connected to such tubular part by spokes, said collar contacting at its peripheral surface directly with the wall of the bore hole, so as to steady and centralize the drill pipe, cutting teeth upon the upper and lower sides of the collar, and spaces provided between the said spokes for the upward or return flow of the fluid pumped down the drill pipe to the cutting face together with the débris carried by such fluid.

In testimony whereof I have signed my name to this specification.

ALBERT EDWARD ATKINSON.